United States Patent
Azam et al.

(10) Patent No.: US 10,691,288 B2
(45) Date of Patent: Jun. 23, 2020

(54) CONTROLLING CONTENT DISPLAYED ON MULTIPLE DISPLAY DEVICES

(71) Applicant: HEWLETT-PACKARD DEVELOPMENT COMPANY, L.P., Houston, TX (US)

(72) Inventors: Syed S. Azam, Houston, TX (US); Thong Thai, Houston, TX (US); Mike Provencher, Houston, TX (US); Rahul V. Lakdawala, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 16/082,401

(22) PCT Filed: Oct. 25, 2016

(86) PCT No.: PCT/US2016/058620
§ 371 (c)(1),
(2) Date: Sep. 5, 2018

(87) PCT Pub. No.: WO2018/080444
PCT Pub. Date: May 3, 2018

(65) Prior Publication Data
US 2019/0087066 A1    Mar. 21, 2019

(51) Int. Cl.
*G06F 3/0481* (2013.01)
*G06F 3/14* (2006.01)
(Continued)

(52) U.S. Cl.
CPC ........ *G06F 3/04812* (2013.01); *G06F 1/1616* (2013.01); *G06F 1/1647* (2013.01);
(Continued)

(58) Field of Classification Search
CPC .... G06F 3/04812; G06F 3/0416; G06F 3/044; G06F 3/0412; G06F 3/017; G06F 1/1616;
(Continued)

(56) References Cited

U.S. PATENT DOCUMENTS

| 8,638,325 B2 | 1/2014 | Kim et al. |
| 8,665,215 B2 | 3/2014 | Schrock et al. |

(Continued)

FOREIGN PATENT DOCUMENTS

| EP | 1990711 A2 | 11/2008 |
| EP | 2887197 A1 | 6/2015 |

(Continued)

OTHER PUBLICATIONS

Boring, "Interacting in Multi-Display Environments", Retrieved from Internet: http://www.sebastianboring.com/content/publications/prints/boring.UbiComp-DC-2007.multi-display-environments.pdf, 2008, 8 pages.

(Continued)

*Primary Examiner* — Muhammad N Edun
(74) *Attorney, Agent, or Firm* — Trop, Pruner & Hu, P.C.

(57) ABSTRACT

A technique includes communicating a display device attachment status to an operating system to inform the operating system whether a first display device is attached to a second display device. The technique includes controlling content displayed on the second display device, including controlling whether the second display device is an extension of the first display device based at least in part on the display device attachment status.

14 Claims, 7 Drawing Sheets

(51) Int. Cl.
  *G06F 1/16* (2006.01)
  *G06F 3/01* (2006.01)
  *G06F 3/041* (2006.01)
  *G06F 3/044* (2006.01)

(52) U.S. Cl.
  CPC .......... *G06F 1/1654* (2013.01); *G06F 1/1677* (2013.01); *G06F 1/1683* (2013.01); *G06F 1/1694* (2013.01); *G06F 3/017* (2013.01); *G06F 3/044* (2013.01); *G06F 3/0412* (2013.01); *G06F 3/0416* (2013.01); *G06F 3/1423* (2013.01); *G06F 2200/1637* (2013.01); *G09G 2356/00* (2013.01)

(58) Field of Classification Search
  CPC .... G06F 3/1423; G06F 1/1654; G06F 1/1683; G06F 1/1677; G06F 1/1694; G06F 2200/1637; G06F 1/1647; G09G 2356/00
  See application file for complete search history.

(56) References Cited

U.S. PATENT DOCUMENTS

| | | | |
|---|---|---|---|
| 9,047,244 B1 | 6/2015 | Puppin | |
| 9,164,546 B2 * | 10/2015 | Sirpal | H04M 1/0266 |
| 2007/0233759 A1 | 10/2007 | Tomlinson et al. | |
| 2010/0313143 A1 | 12/2010 | Jung et al. | |
| 2011/0143769 A1 | 6/2011 | Jones et al. | |
| 2012/0062442 A1 | 3/2012 | Locker et al. | |
| 2013/0019183 A1 | 1/2013 | Reeves et al. | |
| 2013/0268877 A1 | 10/2013 | Han et al. | |
| 2014/0218266 A1 * | 8/2014 | Chen | G06F 3/1446 345/1.3 |
| 2015/0116362 A1 | 4/2015 | Aurongzeb et al. | |
| 2015/0153993 A1 * | 6/2015 | Vis | G06F 3/1446 345/1.3 |
| 2015/0192960 A1 | 7/2015 | Sharma et al. | |
| 2015/0234630 A1 | 8/2015 | Sakai et al. | |

FOREIGN PATENT DOCUMENTS

| | | |
|---|---|---|
| EP | 2919107 A1 | 9/2015 |
| TW | 201142687 A | 12/2011 |
| TW | 201324239 A | 6/2013 |
| TW | 201342195 A | 10/2013 |
| WO | WO-2015094357 A1 | 6/2015 |

OTHER PUBLICATIONS

"OS X: Using Multiple Displays in Mavericks", Retrieved from Internet: https://support.apple.com/en-in/HT202780, Mar. 24, 2016, 7 pages.

\* cited by examiner

CONTROLLING CONTENT DISPLAYED ON MULTIPLE DISPLAY DEVICES

BACKGROUND

A computer system, such as a desktop-based or laptop-based computer system, may include multiple monitors, and a user of the computer system may define how an operating system of the computer system manages the multiple monitors. For example, a user may configure the computer so that the operating system treats one of the monitors as being an extension of the other. With this monitor extension configuration, the user may, for example, drag an object that is displayed on a first monitor to and beyond a display boundary of the first monitor to cause the object to be moved to (and displayed on) a second monitor. As another example, with this monitor extension configuration, a first monitor may be used to display email messages, and a second monitor may display attachments that are opened from the email messages. Other monitor configurations are possible. For example, the user may configure the computer system to display the same content on two monitors, or, for the case of a laptop-based computer system, the user may disable the laptop computer's built-in monitor, while enabling a larger standalone monitor that is connected to the laptop computer.

DETAILED DESCRIPTION

Figure 1:
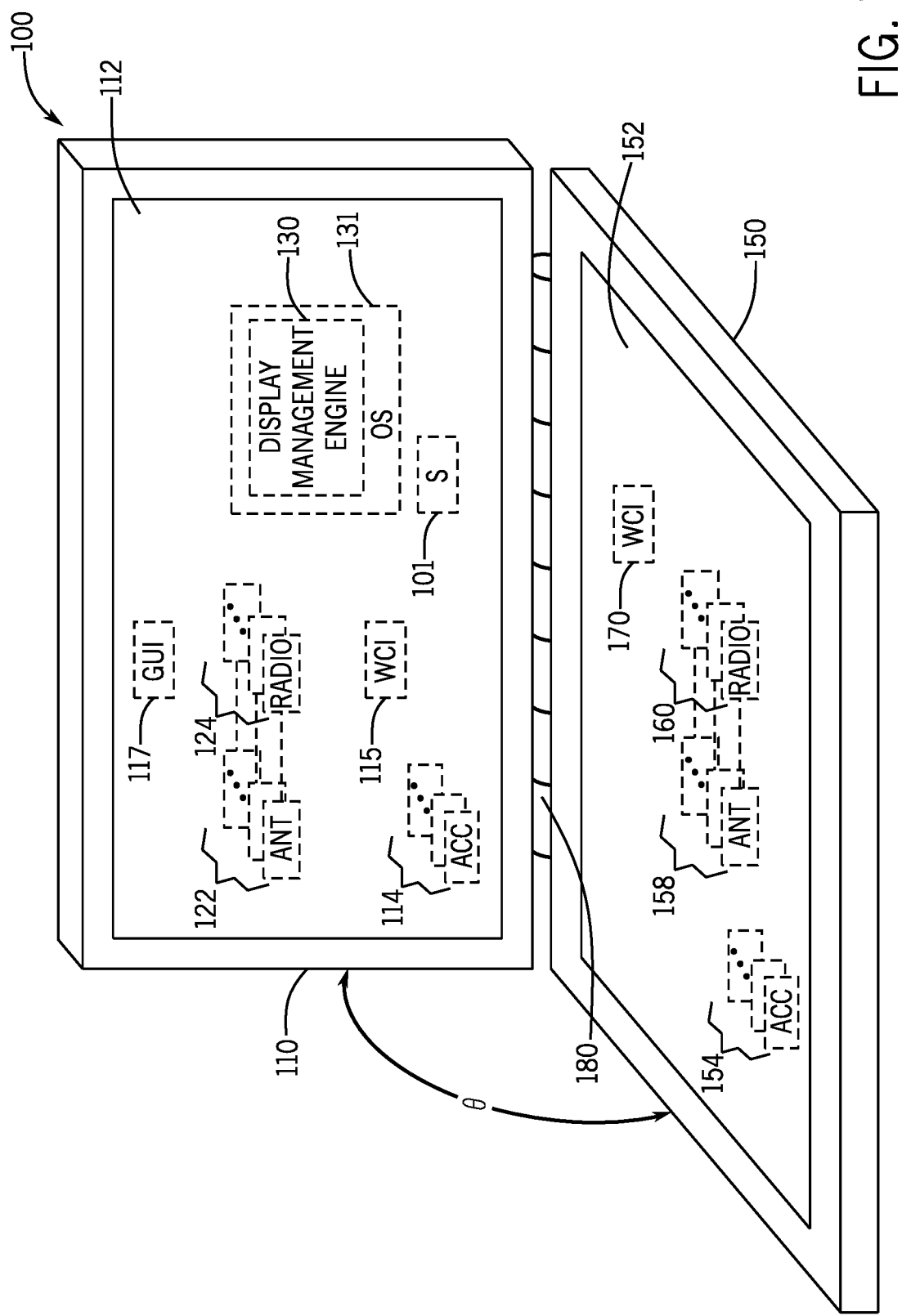
FIG. 1 is a schematic diagram of a computer having multiple display panels according to an example implementation.

In accordance with example implementations that are described herein, an electronic device (a portable computer, for example) has multiple display panels, which may be attached to each other or may be detached from each other. More specifically, in accordance with example implementations, an electronic device may include two display panels that may be attached to each other to form a hinged connection between the display panels. In this context, a "display panel" is an example implementation of a display device, which is constructed to display visual content that is generated by a hardware processor. In accordance with example implementations, the display panel is a unit, which contains, among other potential components, a housing and an electronic visual display device (a light emitting diode (LED)-based touch screen, for example) that has a display surface (called a "display" herein). In accordance with example implementations, the display panel may contain a graphics processor to render and display content on its visual display device of the display panel, along with other components (one or multiple central processing units (CPUs), memory components, one or multiple wireless communication interfaces, and so forth).

In accordance with example implementations, when the display panels are attached to form the hinged connection, the display panels may be rotatably positioned about the hinged connection to configure the electronic device for various device modes. More specifically, the opening angle (the angle about the hinge connection axis) between the display panels may be varied, and the electronic device may be appropriately spatially oriented to configure the electronic device in one of its device modes. As examples, the device modes may include a "clam shell" device mode in which the electronic device may be used like a laptop computer. For the clam shell device mode, the opening angle is close to or near ninety degrees, similar to the working position of the laptop computer. As other examples, the device mode may be a tablet device mode in which the display panels are fully opened so that the electronic device may be used similar to a tablet computer; a tent device mode (a mode in which the display panels are supported on their edges with the hinged connection being elevated so that the electronic device resembles a tent) in which the electronic device may be used, for example, in a collaborative or gaming application in which two users may each interact with a different display panel; a stand device mode (a mode in which one of the display panels serves as a stand to support the other display panel) in which the electronic device may be used to, for example, play video content (a movie, for example) for the user; and so forth.

The display panels may be detached from each other at the hinge connection, and when detached, the display panels may wirelessly communicate data (communicate graphics data, user input data, and so forth) with each other. As an example, the display panels may be detached for purposes of gaming or collaboration between two users who hold the two, detached display panels.

The electronic device contains an operating system that manages the content displayed on the display panels, regardless of whether the display panels are detached or attached to each other. When the display panels are detached, the operating system may, depending on user-defined options, treat one display panel as being an extension of the other. For example, a user, holding a first display panel, may, via a swiping touch gesture, move an object (a window, for example) that is being displayed on the display of the first display panel to a display boundary of the first display panel; and moreover, the user may, through, a swiping touch gesture, move the object to the second display panel.

Challenges may arise, however, in managing content displayed by multiple display devices, such as the display panels, when the display panels may be attached and detached. In this manner, the user may expect one display panel to be treated as an extension of the other when the display panels are detached from each other, but the user may not expect this extension when the display panels are attached to each other. If not for the techniques and systems that are described herein, however, the operating system may be unaware of the connection status, i.e., the operating system may not know whether the display panels are attached or detached.

Another potential challenge to managing content displayed by multiple display devices, such as the display panels, when the display panels may be detached, pertains to interpreting user input for purposes of moving content from one display panel to the other. For example, when the display panels are detached, the selection of an object that is displayed on the display of a first display panel along with a left-to-right swiping touch gesture may be expected to move the object to the display of a second display panel if the second display panel is disposed to the right of the first display panel. If the second display panel is disposed below the first display panel, the user would not expect the object to be transferred to the second display panel with this input, but rather, the user would expect that a left-to-right swiping touch gesture would not move the object beyond the right display boundary of the first display panel. If not for the techniques and systems that are described herein, however, the operating system may be unaware of the relative orientations of detached display panels, and as such, the operating system may not have the information to appropriately process a user input that moves an object toward a display boundary of the display panel.

Example implementations are described herein in which a display attachment status, which indicates whether a first display device is physically attached to a second display device, is communicated to an operating system. The operating system may therefore control whether one display device is treated as an extension of the other (such as when the display devices are detached) or whether content on the first and second display devices is controlled independently (such as when the display devices are attached). Moreover, in accordance with example implementations that are described herein, for display devices that are detached, the operating system is apprised of the relative orientation of one display device relative to the other display device so that the operating system may control movement of content between the display devices based at least in part on the orientation and user input that is associated with the movement of content.

Referring to FIG. 1, as a more specific example, a computer 100 may include multiple display devices, such as display panels 110 and 150. As depicted in FIG. 1, the display panels 110 and 150 may be attached to each other via hinge connection 180. In this manner, in accordance with example implementations, the hinge connection 180 may form a releasable latch. In this manner, the hinge connection 180 may be formed from mating hinge members that are constructed to be attached to each other to attach the display panels 110 and 150 together, and the mating hinge members may be further constructed to allow the display panels 110 and 150 to be detached from each other. When the display panels 110 and 150 are connected by the hinge connection 180, the display panels 110 and 150 may be pivoted about the axes of the hinge connection 180 to change an opening angle Θ between the display panels 110 and 150. In this manner, the opening angle Θ may vary from zero (when the computer 100 is closed) to three hundred sixty degrees when the computer 100 is configured to be in a tablet device mode. For the orientation that is depicted in FIG. 1, the computer 100 resembles the working position of a laptop computer and is in a clam shell device mode. In the clam shell device mode, the bottom display panel 150 may be used for purposes of user input (input via a displayed virtual keyboard, for example); and the upper display unit 110 may display content that is generated by an operating system, utilities, applications, and so forth.

In accordance with example implementations, the computer 100 includes a display management engine 130, which may be part of an operating system 131 of the computer 100. The display management engine 130, among its other functions, controls whether one of the display panels 100 and 150 may be treated as an extension of the other. In this manner, when the display panels 110 and 150 are attached, as depicted in FIG. 1, the display management engine 130, in accordance with example implementations, configures the computer 100 so that the content displayed on the display 112 (of the display panel 110) is independent of the content displayed on the display 152 (of the display panel 150), i.e., one display panel 110, 150 is not treated as an extension of the other. Therefore, user input, such as a mouse movement or a swiping touch gesture, may not be used to move an object from the display 112 (as an example) to the display 152. Thus, the operating system 131 confines the content displayed on the display panel 110 to the boundaries of the display 112 and confines content displayed on the display panel 150 to the boundaries of the display 152.

Figure 2A:
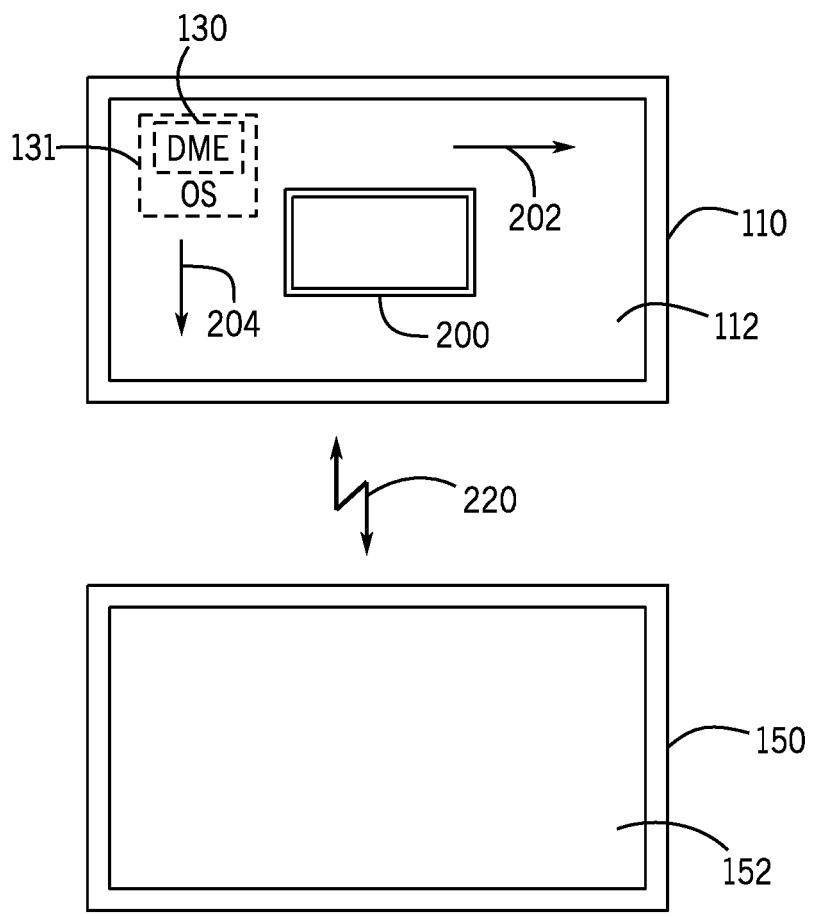
FIG. 2A is an illustration of the display panels of the computer of FIG. 1 being detached from each other and one of the display panels being positioned above the other display panel according to an example implementation.

Referring to FIG. 2A in conjunction with FIG. 1, the display panels 110 and 150 may be detached at the hinge connection 180, which allows the orientation of the display panel 110 relative to the display panel 150 to change. For example, FIG. 2A depicts an example relative orientation of the display panels 110 and 150, when detached, in which the display panel 110 is disposed above the display panel 150. Due to the display panels 110 and 150 being detached, the display management engine 130 allows, with the appropriate user input, content that is displayed on the display 112 of the display panel 110 to be moved to the display 152 of the display panel 150, and vice versa.

For the specific example of FIG. 2A, user input associated with an up-to-down direction 204 may be interpreted by the operating system 131 as requesting downward movement of an object that is displayed on the display 112. For example, the object may be a window 200, which may be dragged, for example, by user input along the direction 204. When the bottom edge of the window 200 reaches the lower boundary of the display 112, for example, further movement, through user input along the direction 204 may cause the operating system 131 to move the window 200 onto the display 152 of the display panel 150 so that the window 200 appears on the display 152 of the display panel 150. In accordance with example implementations, the display panel 110 may contain a central processing unit (CPU) that executes instructions to form the operating system 131, and the display panel 110 may use a wireless connection 220 to communicate data, representing the content to be displayed on the display 152, to the display panel 150. In a similar manner, the user may, through a mouse-directed input or a swiping touch gesture in a direction opposite to the direction 204 may move an object that is displayed on the display 152 to the display 112.

Figure 2B:
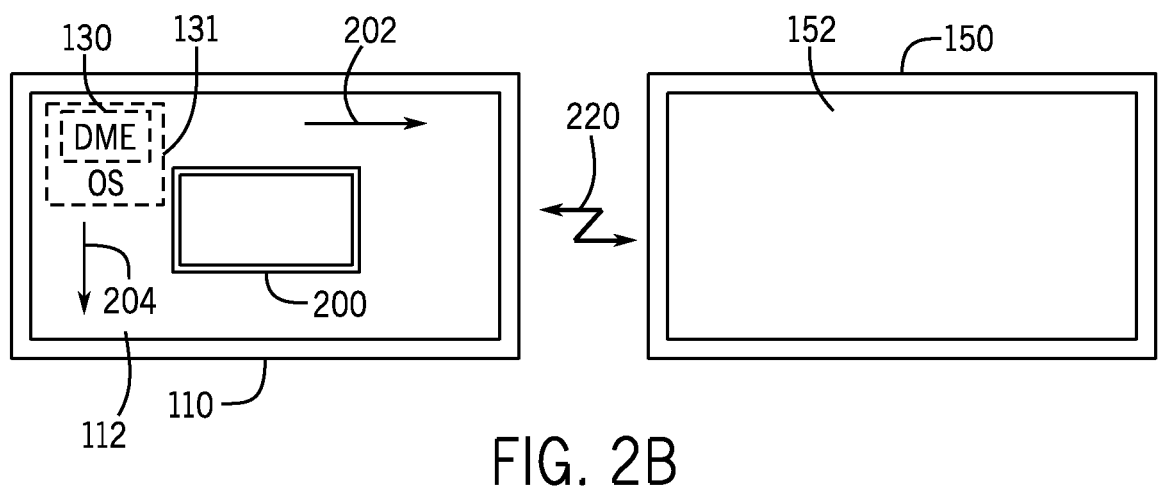
FIG. 2B is an illustration of the display panels of the computer of FIG. 1 being detached from each other and one of the display panels being positioned to the right of the other display panel according to an example implementation.

Referring to FIG. 2B in conjunction with FIG. 1, as another example, the display panel 110 may be located to the left of display panel 150. For this example, the operating system 131 responds to user input directing movement of the window 202 (an example object) along a left-to-right direction 202 to the right of the display 112. In response to further user input directing movement along the direction 202 when the right edge of the window 200 is disposed at the right boundary of the display 112, the operating system 131 may then transfer the window 200 to the display 152.

Referring back to FIG. 1, in accordance with example implementations, the computer system 100 includes a hinge attachment sensor 101 for purposes of indicating, or representing, whether the display panels 110 and 150 are attached or detached. As an example in accordance with some implementations, the sensor 101 may be an optical sensor that is positioned to sense the interruption of light when the hinge connection 180 is formed, thereby providing a signal to represent, or indicate, whether the display panels 110 and 150 are attached or detached. The sensor 101 may be a sensor other than an optical sensor (such as a magnetic sensor, a contact sensor, and so forth), in accordance with further implementations.

Figure 4:
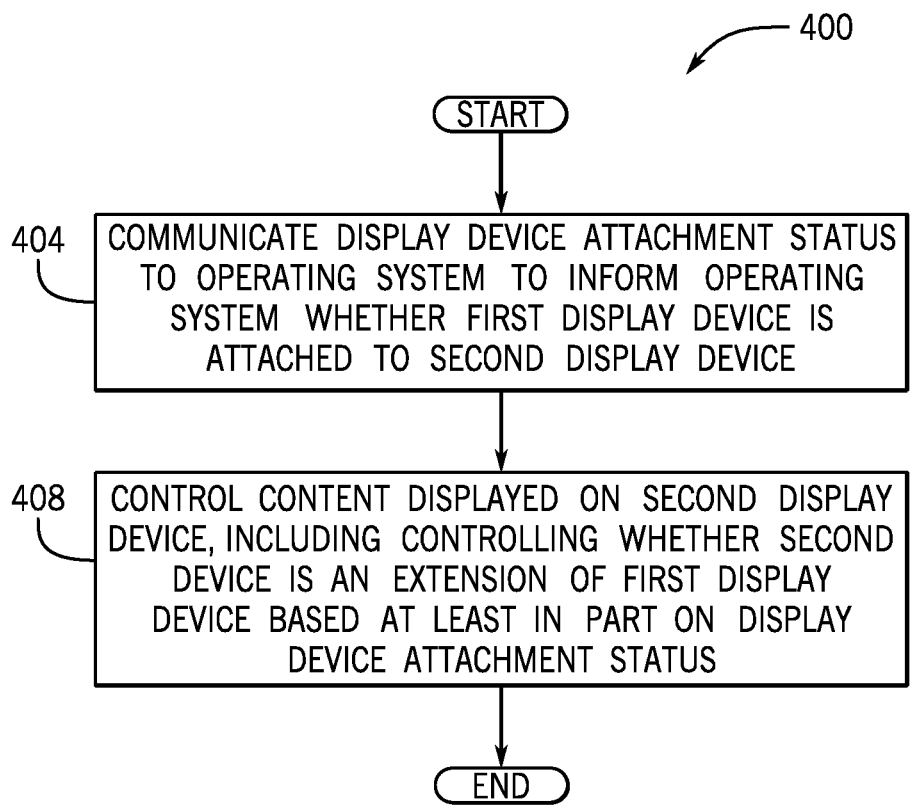
FIG. 4 is a flow diagram depicting a technique to control content displayed on first and second display devices based on whether the display devices are attached to each other.

Thus, referring to FIG. 4 in conjunction with FIG. 1, in accordance with some implementations, a technique 400 includes communicating (block 404) a display attachment status to an operating system to inform the operating system whether a first display device is attached to a second display device. Content that is displayed on the second display device may then be controlled (block 408), including controlling whether the second display device is an extension of the first display device based at least in part on the display attachment status. As an example, in accordance with some implementations, if the display panels 110 and 150 are attached, then the operating system may control content displayed on the respective displays 112 and 152 independently from each other and not respond to user input that would otherwise direct the movement of content from one display panel 110, 150 to the other. As such, objects may be moved to a boundary of the display of one display panel without being transferred to the display of the other display panel. However, when the display attachment status indicates that the display panels 110 and 150 are detached, then the operating system 131 may move content beyond the display boundary to another display based on user-directed movement input.

A potential challenge with moving content between detached display panels is that the operating system 131 may be unaware of the relative orientation of one display panel 110, 150 relative to the other. For example, referring back to FIG. 2A, if the operating system 131 is unaware of the relative orientations of the detached display panels 110 and 150, then the operating system 131 would not know whether user-directed movement along the left-to-right direction 202 or the up-to-down direction 204 may be used to move an object, such as the window 200, to the display 152 of the display panel 150.

Referring back to FIG. 1, in accordance with example implementations, the computer 100 includes one or multiple sensors for purposes of identifying the orientation of the display panel 110 relative to the display panel 150. More specifically, in accordance with some implementations, the computer 100 may include antennas and radios that may be used for purposes of determining the relative orientation. For example, in accordance with some implementations, the display panel 110 contains one or multiple antennas 122 that are coupled to one or multiple radios 124. In a similar manner, the display panel 150 may include one or multiple antennas 158 that are coupled to one or multiple radios 160.

In this manner, in accordance with example implementations, the display management engine 130 may employ a triangulation technique for purposes of determining the orientation of the display panels 110 and 150. For example, the display management engine 130 may, based on received signal strength indicators (RSSIs), which are provided by the radios 124 and knowledge of the spatial orientations of the antennas on the display panels 110 and 152, determine the approximate relative orientations of the display panel 150 relative to the display panel 110.

Figure 3:
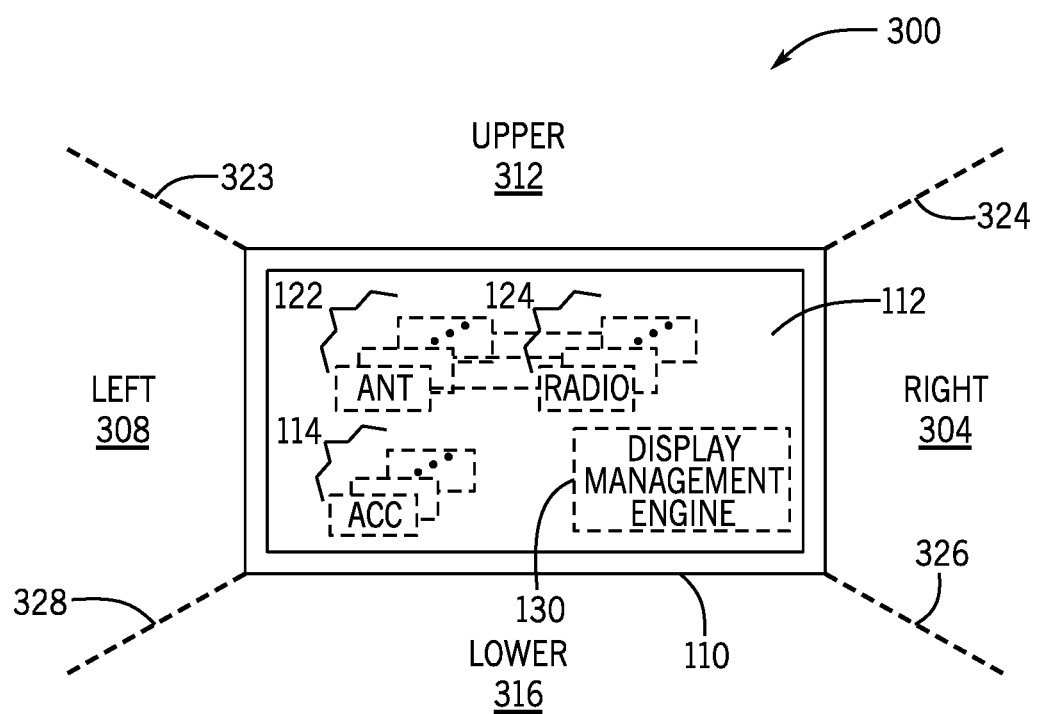
FIG. 3 is an illustration of zones about a first display panel in which another display panel may be positioned according to an example implementation.

Referring to FIG. 3 in conjunction with FIG. 1, in accordance with some implementations, the display management engine 130 may, based on the results of the triangulation technique, classify whether the second display panel 150 is in one of four quadrants relative to the first display panel 110: a right quadrant 304, a left quadrant 308, and an upper quadrant 312 or a lower quadrant 316. As shown in FIG. 3, the quadrants may be demarcated by diagonally extending boundaries. For example, the upper 312 and right 304 quadrants may be separated by a boundary 324 that extends upwardly and to the right from the upper, right corner of the display panel 110. Similarly, the other quadrants 304, 308, 312 and 316 may be separated by similar boundaries 326 (separating the right 304 and lower 316 quadrants), 328 (separating the lower 316 and left 308 quadrants), and 322 (separating the left 308 and upper 312 quadrants).

The example that is depicted in FIG. 3 is for a landscape orientation of the display panel 110. The interpretation of the relative orientations may depend on whether the display panel 110 is oriented in a landscape orientation (as depicted in FIG. 3) or in a portrait configuration in which the display panel 110 is rotated by ninety degrees relative to the orientation shown in FIG. 3. In this manner, for a portrait orientation in which the display panel 110 is rotated ninety degrees counterclockwise from the orientation depicted in FIG. 3, the upper quadrant 312 becomes the right quadrant, the right quadrant 304 becomes the lower quadrant, and so forth.

Referring to FIG. 1, for purposes of determining whether the display panel 110 is oriented in a portrait, reverse portrait (i.e., rotated one hundred eighty degrees from the portrait orientation), landscape or reverse landscape orientations, the display panel 110 may include one or multiple accelerometers 114. For example, in accordance with some implementations, the display panel 110 may include three accelerometers having respective sensitivities directed along three orthogonal axes. In a similar manner, the display panel 150 may contain one or multiple accelerometers 154. It is noted that determinations of the orientation of the display panel 110, 150 may be, in general, used for such purposes as determining the relative orientations of one display panel 110, 150 relative to the other display panel 110, 150; determining which edge of one display panel 110, 150 is adjacent to the other display panel 110, 150; determining the orientation of content displayed on the display panel 110, 150; and so forth.

Figure 5A:
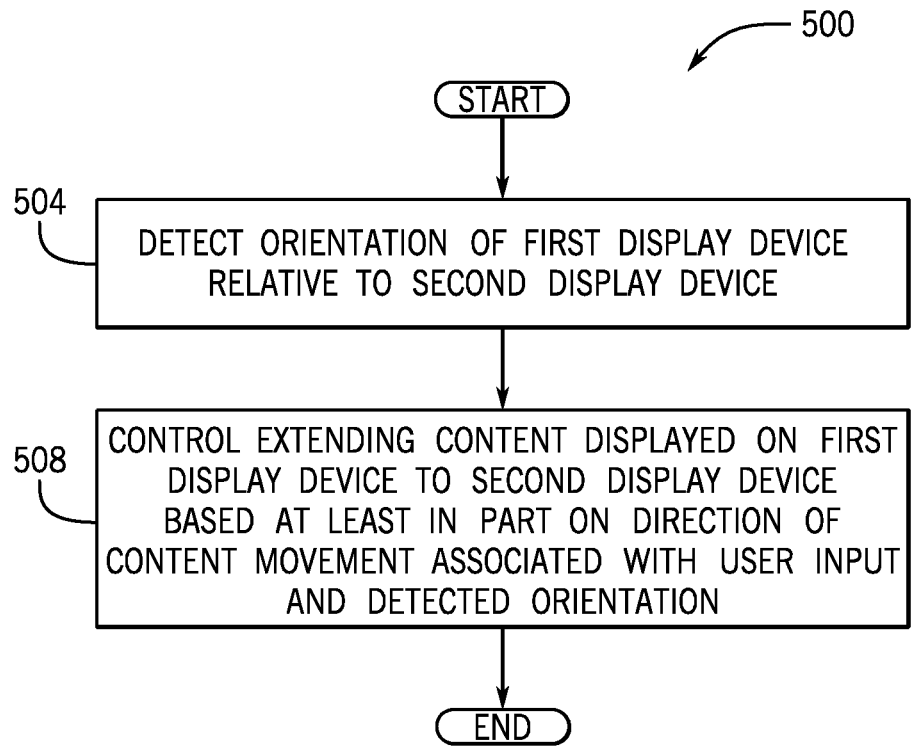
FIG. 5 is a flow diagram depicting a technique to control content displayed on first and second display devices based on relative display device orientation according to an example implementation.
Figure 5B:
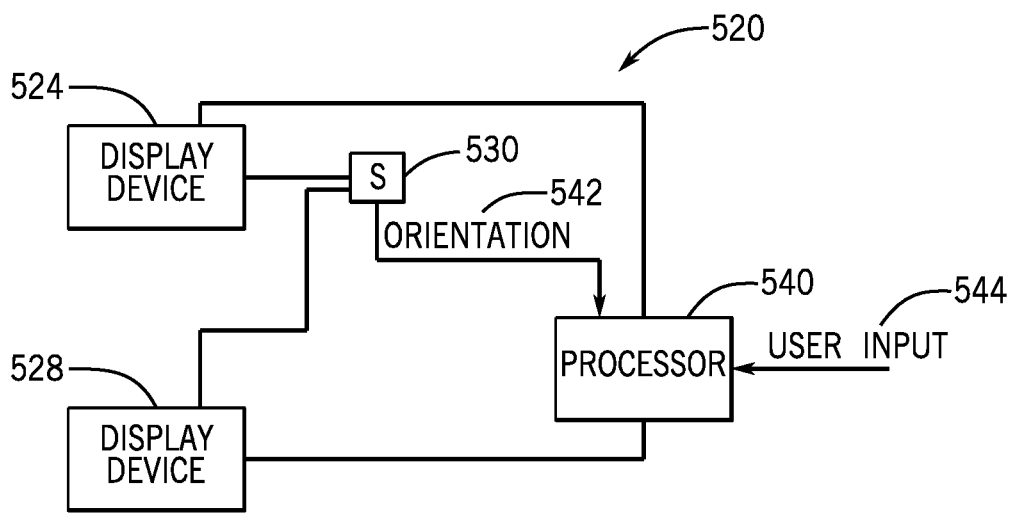

Thus, referring to FIG. 5A in conjunction with FIG. 1, in accordance with example implementations, a technique 500 includes detecting (block 504) the orientation of a first display device relative to a second display device. Pursuant to block 508, the technique 500 includes controlling the extension of content displayed on the first display device to the second display device based at least in part on a direction associated with user input and the detected orientation. In this manner, referring to FIG. 5B, a system 520 in accordance with example implementations includes a first display device 524, a second display device 528, at least one sensor 530 and a processor 540. The sensor(s) 530 detects an orientation 542 of the first display device 524 relative to the second display device 528. The processor 540 controls extending content displayed on the first display device 524 relative to the second display device 528 in response to a direction associated with a user input 544 based at least in part on the detected orientation 542.

Referring back to FIG. 1, in accordance with example implementations, the display panel 150 may have one or more components similar to the display panel 110. For example, the display panel 150 may include the accelerometers 154; the radios 160; the antennas 158; and so forth. Moreover, as depicted in FIG. 1, in accordance with some implementations, user input units 110 and 150 may communicate wirelessly when detached from each other. For example, in accordance with some implementations, the display panels 110 and 150 may include respective wireless communication interfaces 115 and 170. These wireless communication interfaces 115 and 170 may or may not include the radios 124 and 160, depending on the particular implementations. As a more specific example, the wireless communication interfaces 115 and 170 may support communications that comply with IEEE 802.11 (i.e., WiFi-based communications).

Figure 6:
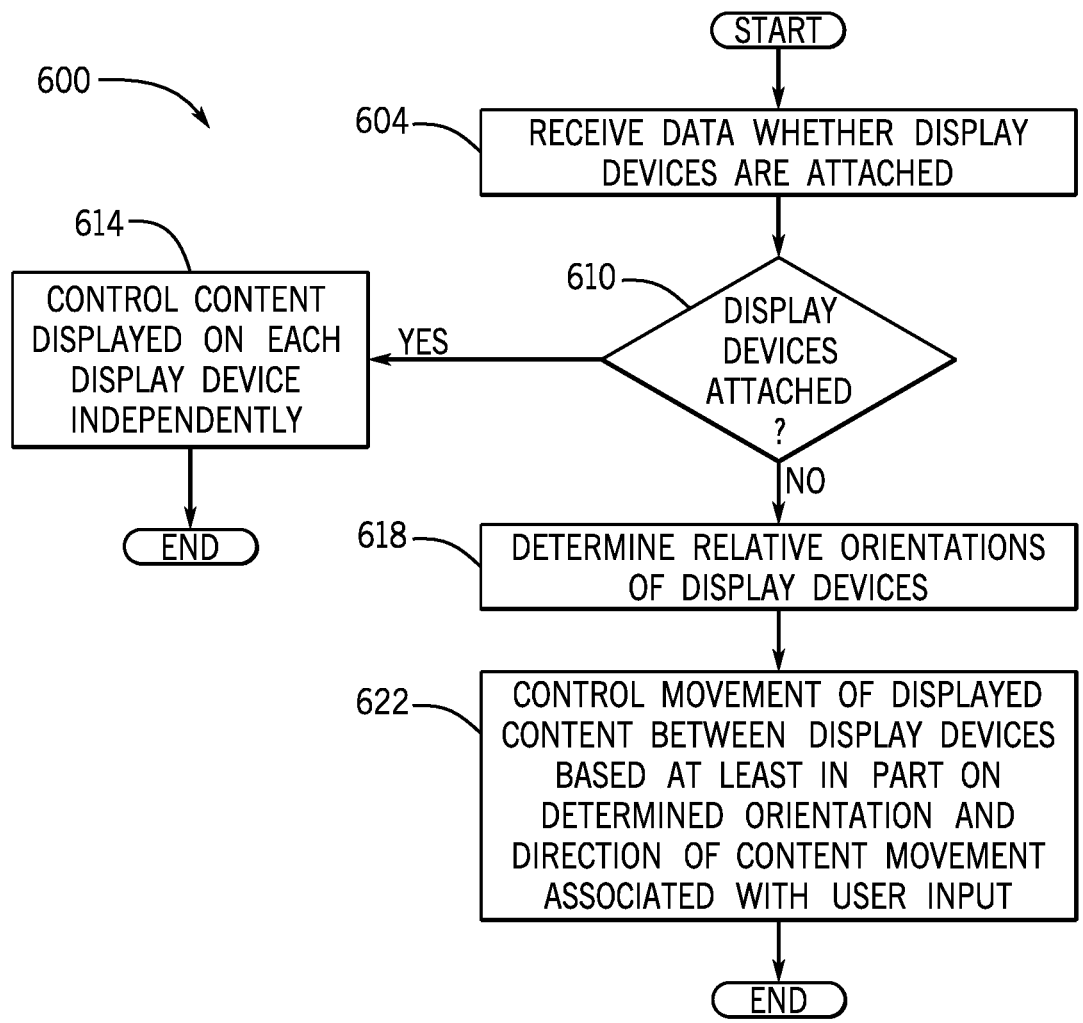
FIG. 6 is a flow diagram depicting a technique to control content movement between first and second display devices according to an example implementation.

In accordance with example implementations, the display management engine 130 may take into account the display device attachment status and the relative display device orientation for purposes of controlling the movement of content between the display devices. More specifically, referring to FIG. 6 in accordance with example implementations, the display management engine may receive (block 604) data representing whether display devices are attached and upon a determination (decision block 610) that the display devices are attached, the display management engine may control (block 614) displayed content on each display device independently. Upon determination (decision block 610) that the display devices are detached, the display management engine may determine (block 618) the relative orientations of the display devices and control (block 622) movement of the displayed content based at least in part on the determined orientation and the user input associated with content movement, pursuant to block 622.

In accordance with example implementations, the display management engine may be configured by user-defined options. For example, in accordance with some implementations, a graphical user interface (GUI) 117 (FIG. 1) of the computer 100 may allow the user to define if content is to be extended between the two display panels 110 and 150 when the display panels 110 and 150 are detached. For example, in accordance with some implementations, the user, via the GUI 117, may provide input indicating a configuration option in which content is not to be extended between the display panels 110 and 150 when the display panels 110 and 150 are detached. As another example, the user, via the GUI 117, may disable the display of one of the display panels 110 and 150.

Figure 7:
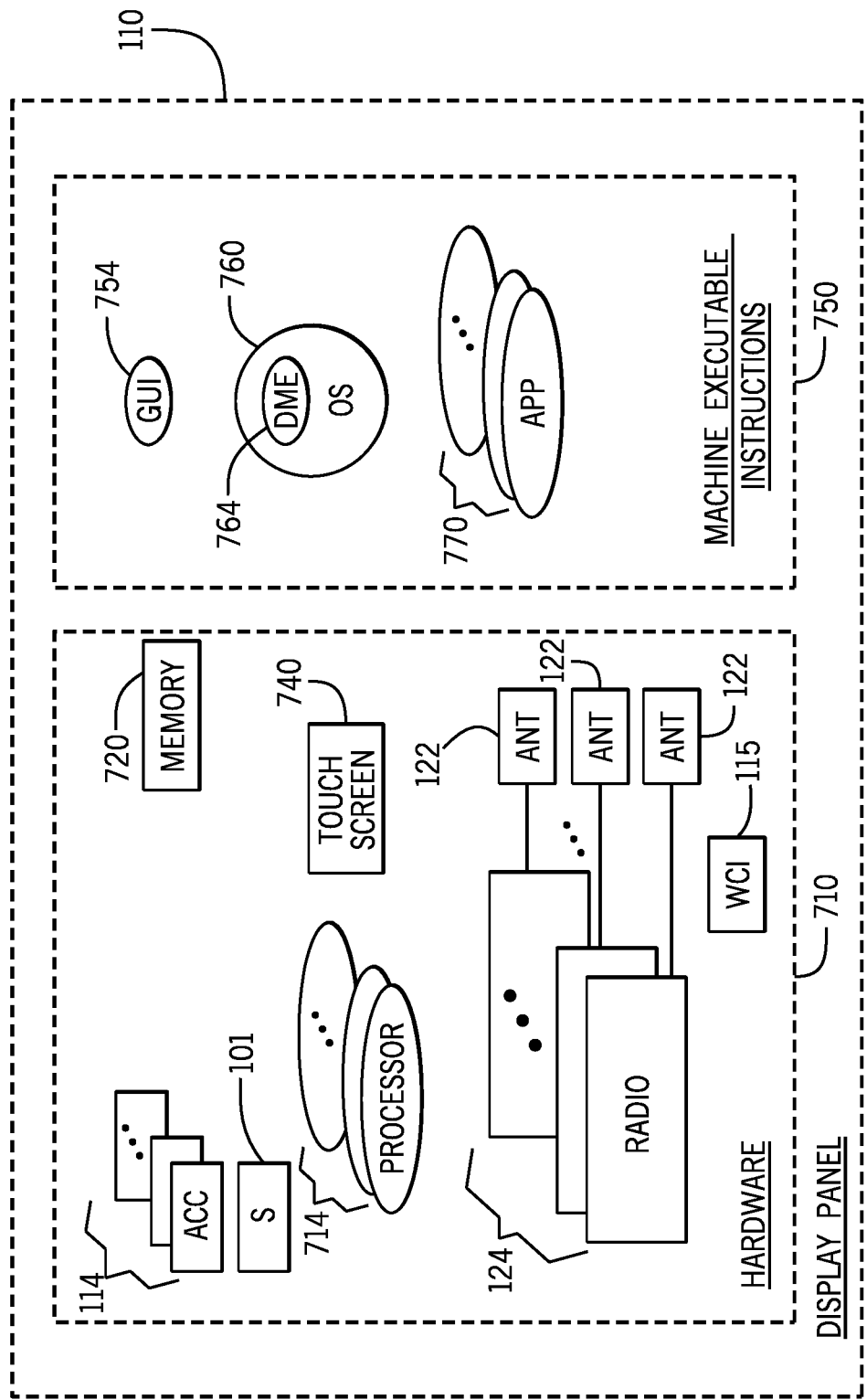
FIG. 7 is a schematic diagram of a display panel according to an example implementation.

Referring to FIG. 7, in accordance with example implementations, the display panel 110 may have an architecture, such as the one depicted in FIG. 7. It is noted that the display panel 150 may have a similar architecture.

The display panel 110, in general, is an actual, physical machine that is made up of actual hardware 710 and machine executable instructions 750, or "software." In accordance with some implementations, the hardware 710 may include one or multiple processors 714 (one or multiple central processing units (CPUs), one or multiple CPU processing cores, and so forth). The hardware 710 may include a memory 720, which may, for example, contain data representing user-defined configuration options for display content management; data pertaining to images displayed on the display screens of the display panels; and so forth. The memory 720 may further store executable instructions that, when executed by the processor (714) may cause the processor (714) to perform some or all of one or more of the techniques that are described herein.

In general, the memory 720 is a non-transitory memory that may be formed from, as examples, semiconductor storage devices, memristors, magnetic storage devices, phase change memory devices, a combination of one or more of these storage technologies, and so forth, depending on the particular implementation.

In accordance with some implementations, the hardware 710 of the display panel 110 may include various other components, such as a touchscreen 740 (that provides the display 112), the radios 124, the antennas 122; the wireless communication interface 115, the accelerometers 114, various input/output (I/O) devices; and so forth.

In accordance with example implementations, the machine executable instructions 750 may include, for example, instructions that when executed by the processor (714), cause the processor (714) to form one or more of the following: instructions 754 to form the GUI 117 (FIG. 1); instructions 760 to form the operating system 131 (FIG. 1); instructions 764 to form the display management engine 130 (FIG. 1); instructions 770 to form one or multiple applications; and so forth.

In accordance with further example implementations, all or part of the above-described processor-based architecture may be replaced by dedicated, hardware circuitry or by one or multiple application specific integrated circuits (ASICs). For example, in accordance with some implementations, the display management engine 130 may be formed from one or multiple ASICs. Thus, many implementations are contemplated, which are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    communicating a display device attachment status to an operating system to inform the operating system whether a first display device is attached to a second display device; and
    controlling content displayed on the second display device, wherein controlling the content comprises whether the second display device is an extension of the first display device based at least in part on the display device attachment status,
    wherein controlling whether the second display device is an extension of the first display device comprises, in response to the status indicating that the first display device is detached from the second display device, controlling the content displayed on the first display device and the content displayed on the second display device based at least in part on a user defined configuration setting identifying a predefined relationship between the first and second display devices when the first display device is detached from the second display device.

2. The method of claim 1, wherein controlling whether the second display device is an extension of the first display device comprises, in response to the status indicating that the first display device is attached to the second display device, controlling the content displayed on the first display device and the content displayed on the second display device independently.

3. The method of claim 1, wherein the configuration setting identifies the second display device as being independent of the first display device.

4. The method of claim 1, wherein the configuration setting identifies one of the first and second display devices as being disabled.

5. The method of claim 1, further comprising:
communicating an orientation of the second display device relative to the first display device to the operating system; and
controlling content displayed on the first and second display devices based at least in part on the orientation.

6. The method of claim 1, further comprising communicating an orientation status of at least one display device of the first and second display devices to the operating system to indicate whether the at least one display device is in a portrait orientation or in a landscape orientation, the method further comprising controlling content displayed on the first and second display devices based at least in part on the orientation status.

7. A system comprising:
a first display device;
a second display device;
at least one sensor to detect an orientation of the first display device relative to the second display device, wherein the orientation identifies whether the first display device is in one of an upper quadrant relative to the second display device, the first display device is in a lower quadrant relative to the second display device, the first display device is in a right quadrant relative to the second display device, or the first display device is in a left quadrant relative to the second display device; and
a processor to control extending content displayed on the first display device to the second display device in response to a direction associated with a user input based at least in part on the detected orientation.

8. The system of claim 7, further comprising:
a latch to releasably attach the first and second display devices together; and
a sensor to detect whether the first and second display devices are attached,
wherein the processor further controls extending the content based at least in part on whether the first and second display devices are attached.

9. The system of claim 7, wherein the at least one sensor comprises at least one accelerometer attached to the first display device and at least one accelerometer attached to the second display device.

10. The system of claim 7, further comprising:
wireless interfaces attached to the first and second display devices;
wherein the processor is attached to one of the first and second display devices and uses the wireless interfaces to communicate the content to the other of the first and second display devices.

11. An article comprising a non-transitory computer readable storage medium to store instructions that when executed by a computer cause the computer to:
receive first data indicating whether a first display device of the computer is attached to a second display device of the computer;
in response to the first data indicating that the first display device is attached to the second display device, controlling displaying of content on the first display device independently from controlling displaying of content on the second display device; and
in response to the first data indicating that the first display device is detached from the second display device, wherein determining the orientation comprises determining whether the first display device is in an upper quadrant relative to the second display device, the first display device is in a lower quadrant relative to the second display device, the first display device is in a right quadrant relative to the second display device, or the first display device is in a left quadrant relative to the second display device and controlling movement of content from being displayed on the first display device to being displayed on the second display device in response to user input based at least in part on second data indicating an orientation of the second display device relative to the first display device.

12. The article of claim 11, the storage medium storing instructions that when executed by the computer cause the computer to allow movement of content displayed on the first display device to the second display device based at least in part on whether a user configuration setting identifies the second display device as being an extension of the first display device.

13. The article of claim 11, the storage medium storing instructions that when executed by the computer cause the computer to:
identify an edge of a display surface of the first display device identified by at least a direction associated with the user input and an object displayed on the first display device;
determine whether the edge is consistent with moving the object from the first display device to the second display device based at least in part on the orientation of the second display device relative to the first display device; and
selectively move the object to the second display device based at least in part on the determination.

14. The article of claim 13, wherein the orientation identifies whether the second display device is disposed to the right of the first display device, to the left of the first display device, above the first display device or below the first display device, the storage medium storing instructions that when executed by the computer cause the computer to move the object to the second display device based at least in part on whether the identified edge corresponds to the orientation identifications.

* * * * *